Sept. 19, 1933.  F. F. NORD  1,927,069
METHOD OF INFLUENCING THE SPEED OF ENZYMATIC REACTIONS
Filed June 1, 1928
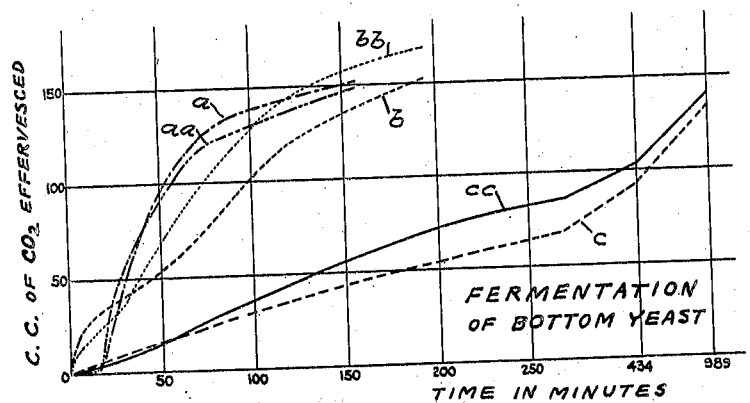
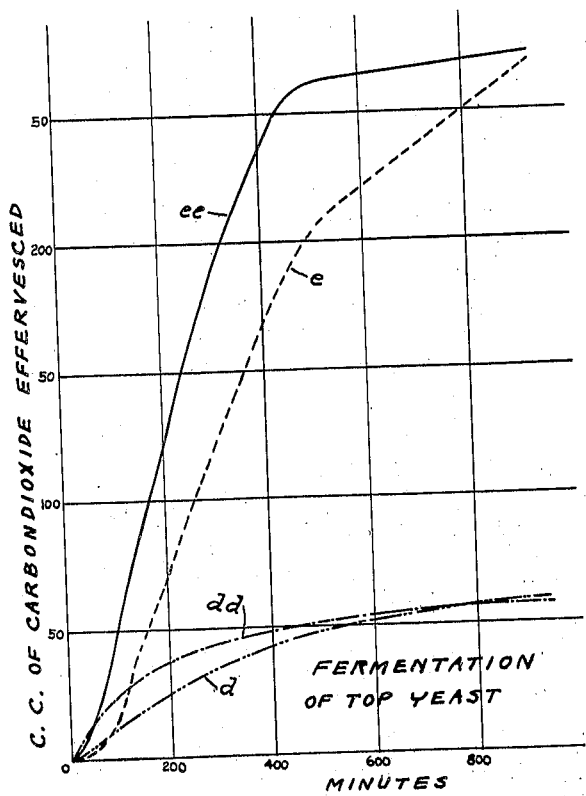
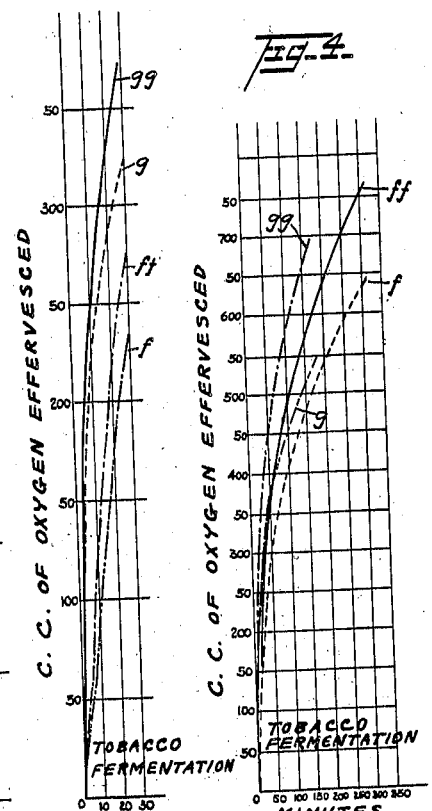
INVENTOR.
Friedrich Franz Nord.
BY Rudolf Wildermann
his ATTORNEY.

Patented Sept. 19, 1933

1,927,069

UNITED STATES PATENT OFFICE 1,927,069

METHOD OF INFLUENCING THE SPEED OF ENZYMATIC REACTIONS

Friedrich Franz Nord, Berlin, Germany

Application June 1, 1928, Serial No. 282,230, and in Germany and Great Britain June 3, 1927

8 Claims. (Cl. 195—20)

I have invented a method of controlling enzymatic reactions by certain agents and one of the objects of these improvements is to provide in an enzymatic reaction, by suitable agents, a protection for the enzymes against deleterious influences of the intermediate or final products of the reaction without retarding or impairing the activity of the enzymes.

I also propose to accelerate by suitable agents an anzymatic reaction, maintaining, nevertheless, the activity of the enzymes.

Another field of application of my process of activating enzymes lies in the stimulation of the metabolism of diseased cells, thus preventing their further growth by the subsequent lack of fermentable substrata.

In producing chemical changes by means of enzymes, the concentration of the enzyme-substratum complex is assumed to be the factor primarily influencing the speed of reaction. My invention is based on the observation that, when a colloidal enzyme solution has been frozen, its activity is considerably increased with a simultaneous, corresponding variation of its sensitiveness towards intermediate processes and intermediate and final products. Enzymes act, after the liquid they are contained in has been frozen, as lyophyle colloids. If, having been frozen, the emulsoid of an enzyme, or cells exhibiting enzyme actions are brought into contact with certain agents,—unsaturated hydrocarbons, for instance,—an unexpected result is obtained: The enzyme activity is maintained for a longer time, i. e., the injurious effect of the intermediate and final products of the reaction upon the enzymes is checked. My explanation of the phenomenon is that said agents, without being chemically involved in the reaction, enhance the permeability of the membrane of the cells and form an adsorbing layer on the active surface of the enzymes; thus they induce an acceleration of the reaction and they also protect the surface of the enzymes from damage by the intermediate and final products. In a similar, though perhaps less pronounced manner, the agents referred to influence enzymatic reactions in which the emulsoids or cells exhibiting enzyme action are not frozen previous to the introduction of such agents.

In dough, for example, it is possible to increase, by my process, the amylolitic hydrolysis as well as the formation of crust in the baking operation proper.

In the presence of an ethylene, yeast zymases can be used directly for the normal fermentation of carbohydrates of the six-atom carbon chain series or mixtures thereof, even when their effectiveness has been impaired by products of this fermentation, for instance by pyruvic acid. The agents referred to act upon the cells of tobacco leaves primarily by raising their permeability which manifests itself by the more rapid decomposition of hydrogen peroxide by the catalase present.

My invention is carried out by bringing a cell system or a suspension of enzyme for a short time, substantially at room temperature, into contact with certain agents; such agents are nitrous oxide, acetylene, ethylene, propylene, butylene, amylene or mixtures of two or more of the ethylenes or of an ethylene with nitrous oxide. The weakest effect is produced by nitrous oxide, a much stronger effect by acetylene. These agents are readily adsorbed by the enzyme or increase the permeability of the cells. If an emulsoid had first been frozen and the activity of the colloidal enzyme had been increased thereby, the agents are more readily adsorbed. The effect of the formation of an adsorption layer on the enzymes is of even greater importance when the solution had been frozen, since the freezing increased the sensitivity of the enzyme to deleterious influences.

An increase of the surface tension of the emulsoid is measured after the introduction of the agents. This showns unequivocally that the gases effect a change in the activity of the surface of the colloidal parts, the enzymes. That is possible only, if at least part of the gas is adsorbed at the surface of the enzyme; in other words, an adsorption layer is formed on the enzymes.

Having thus treated a system of cells exhibiting enzyme or an emulsoid, I proceed with the fermentation.

In the drawing I have plotted curves showing the actual progress of some comparative tests I have carried out to illustrate my invention. The abscissæ show the time in minutes whereas the ordinates show the effervescence in cubic centimeters of carbon dioxide in Figures 1 and 2 and of oxygen in Figures 3 and 4, respectively. Those curves, which indicate the ordinary procedure used for a comparative check of my tests, are indicated by single letters whereas the corresponding double letters indicate the curve of observations according to my improved method.

Figure 1 shows three consecutive tests performed with a bottom yeast solution.

Figure 2 shows two consecutive tests with a top yeast.

Figures 3 and 4 show a rotation of tests on tobacco leaves.

The following examples illustrate the invention:

*Example 1.*—50 grams of dry yeast from brewery bottom yeast are intimately mixed with 150 cc. of tap-water saturated with carbon dioxide and are then macerated therewith for 6–7 hours at 25–26° C. Subsequently the solution is twice centrifuged for the purpose of removing the cell constituents completely, and then I determine the surface tension or viscosity of the solution which is now substantially free of cells. The resulting liquid, a zymase solution, retains its activity for some weeks, when stored at about minus 10° C. (at which temperature the solution freezes). A gentle stream of commercial ethylene is passed in the course of 1–15 minutes through 20 cc. of this zymase solution. The solution is then allowed to stand over-night in a closed container in a cool place. It is then mixed with 1 gram of glucose and the quantity of carbon dioxide effervesced at 30° C. is measured by displacement of a saturated common salt solution saturated with carbon dioxide contained in a burette graduated in tenths of a cubic-centimeter. As a control I use an identical zymase solution which has not been exposed to ethylene. Curves $a$ and $aa$ in Figure 1 illustrate the difference in the speed of reaction at this stage. After the larger part of the sugar has been consumed, each one of the solutions is again mixed with 1 gram of glucose and now the comparatively stronger activity of the treated zymase is still more apparent (curves $b$ and $bb$ in Figure 1). For a further demonstration I add another 0.5 gram of glucose (curves $c$ and $cc$ in Figure 1). In the meantime the portion of the original solution which had not been used for the foregoing test has been stored for 24 hours at about minus 10° C., and has been used, after thawing, for the fermentation of sugar under similar conditions. In the first period of the reaction the effervescence of 5, 6 and more cubic centimeters of carbon dioxide per minute can be measured, which fact is in agreement with the variation of the viscosity, which falls from 80,80 sec/25° to 78,36 sec/25°, or with the increased surface tension which rises from 41,45 dynes/25° to 45,89 dynes/25°.

*Example 2.*—Ordinary ethylene is passed for 5 minutes in a gentle stream of 60–70 bubbles per minute through 20 cc. of a 10% suspension of top yeast in tap-water saturated with carbon dioxide and right afterwards the fermentation is brought about by repeated addition of portions of 1 gram each of glucose.

*Example 3.*—Through 20 cc. of a similar suspension of top yeast, ethylene is passed, as described in the preceding example, and the solution, after it has remained in a cool place under cover over-night, is mixed with 0.2 gram of freshly distilled pyruvic acid (curves $d$ and $dd$ in Figure 2 show the fermentation of the acid without and with the "protector," respectively). The reaction, a fermentation of the pyruvic acid, is finished in about 24 hours. The yeast is then washed several times with water, quickly centrifuged and then suspended in tap-water saturated with carbon dioxide. Fermentation is carried out after addition of portions of glucose of 1 gram each (curves $e$ and $ee$ in Figure 2).

*Example 4.*—Through a suspension of 5 grams of cuttings of fresh tobacco in 60 cc. of water, ethylene is passed and the suspension is then diluted with 15 cc. of a 30% hydrogen-peroxide solution, in such a manner that the initial concentration of hydrogen peroxide amounts to about 6 per cent (Figures 3 and 4 illustrate two tests of this kind, in curves $f$ and $ff$, and $g$ and $gg$).

*Example 5.*—Barley is steeped in the usual manner for 72 hours with water saturated with acetylene, and thereafter submitted to germination. The steeping water, which is changed at regular intervals, is likewise saturated with acetylene. The germination is carried out at a temperature not exceeding 15° C. and is interrupted on the sixth day. The green malt possesses the usual mellowness and a diastatic power 20 per cent higher than malt prepared in a like manner from barley which has not been exposed to acetylene.

In consequence of the greater speed of enzymatic reaction attained by the method of my invention, an equal quantity of reaction products can be obtained with a smaller proportion of enzyme, or a greater speed of reaction can be obtained without changing the proportion of enzymes.

In the light of these discoveries I claim:

1. The method of influencing enzymatic reactions in substances exhibiting enzyme activity, comprising passing unsaturated hydrocarbon over said substances.

2. The method of influencing enzymatic reactions in substances in which enzymes are colloidally suspended, comprising passing unsaturated hydrocarbon through said substances.

3. The method of influencing enzymatic reactions in substances exhibiting enzyme activity, comprising passing over said substances nitrous oxide, thereby increasing the enzyme activity.

4. The method of influencing enzymatic reactions in substances in which enzymes are colloidally suspended, comprising passing nitrous oxide into said substances, thereby increasing the power of said enzymes.

5. The method of influencing enzymatic reactions in substances in which enzymes are colloidally suspended, comprising freezing, thawing, and passing unsaturated hydrocarbon into said substances, thereby increasing the power of said enzymes.

6. The method of influencing enzymatic reactions in substances in which enzymes are colloidally suspended, comprising freezing, thawing, and passing nitrous oxide into said substances, thereby increasing the power of said enzymes.

7. The method of influencing enzymatic reactions in substances comprising cells exhibiting enzyme activity, comprising freezing, thawing and passing unsaturated hydrocarbon over said cells in said substances, thereby increasing the enzyme activity in said substances.

8. The method of influencing enzymatic reactions in substances comprising cells exhibiting enzyme activity, comprising freezing, thawing and passing nitrous oxide over said cells in said substances, thereby increasing the enzyme activity in said substances.

FRIEDRICH FRANZ NORD.